(12) United States Patent
Kalathuru et al.

(10) Patent No.: US 12,142,041 B2
(45) Date of Patent: Nov. 12, 2024

(54) ENHANCING VIEWING EXPERIENCE BY ANIMATED TRACKING OF USER SPECIFIC KEY INSTRUMENTS

(71) Applicant: Adeia Guides Inc., San Jose, CA (US)

(72) Inventors: Harshavardhan Reddy Kalathuru, Andhra Pradesh (IN); Padmassri Chandrashekar, Karnataka (IN); Daina Emmanuel, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 155 days.

(21) Appl. No.: 17/375,559

(22) Filed: Jul. 14, 2021

(65) Prior Publication Data

US 2023/0013988 A1    Jan. 19, 2023

(51) Int. Cl.
| | |
|---|---|
| *G06T 11/00* | (2006.01) |
| *G06F 18/21* | (2023.01) |
| *G06V 20/20* | (2022.01) |
| *G06V 20/40* | (2022.01) |
| *G10L 25/57* | (2013.01) |

(52) U.S. Cl.
CPC .............. *G06V 20/42* (2022.01); *G06F 18/21* (2023.01); *G06T 11/00* (2013.01); *G06V 20/20* (2022.01); *G10L 25/57* (2013.01); *G06V 20/44* (2022.01)

(58) Field of Classification Search
CPC ........ G06V 20/42; G06V 20/20; G06V 20/44; G06V 10/62; G06V 20/46; G06V 2201/10; G06F 18/21; G06T 11/00; G10L 25/57; G10L 15/00
See application file for complete search history.

(56) References Cited

U.S. PATENT DOCUMENTS

| | | | |
|---|---|---|---|
| 2018/0018510 A1* | 1/2018 | Williams | G11B 27/10 |
| 2018/0301169 A1* | 10/2018 | Ricciardi | G11B 27/036 |
| 2019/0087661 A1* | 3/2019 | Lee | G06V 10/82 |
| 2020/0193163 A1* | 6/2020 | Chang | H04N 21/4662 |

* cited by examiner

*Primary Examiner* — Syed Haider
(74) *Attorney, Agent, or Firm* — Haley Guiliano LLP

(57) ABSTRACT

Systems and methods are provided for identifying a key instrument in an event. One example method includes receiving a capture of the event and identifying, at a first computing device, the event. The key instrument is identified at the first computing device. An indicator to apply to and/or around the identified key instrument is generated for display.

20 Claims, 12 Drawing Sheets

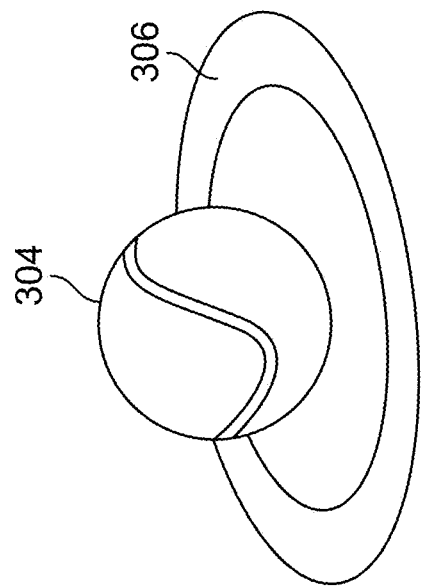
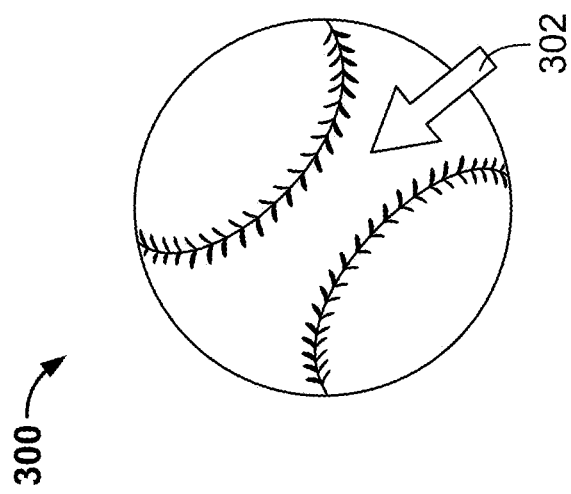
FIG. 3B
FIG. 3A

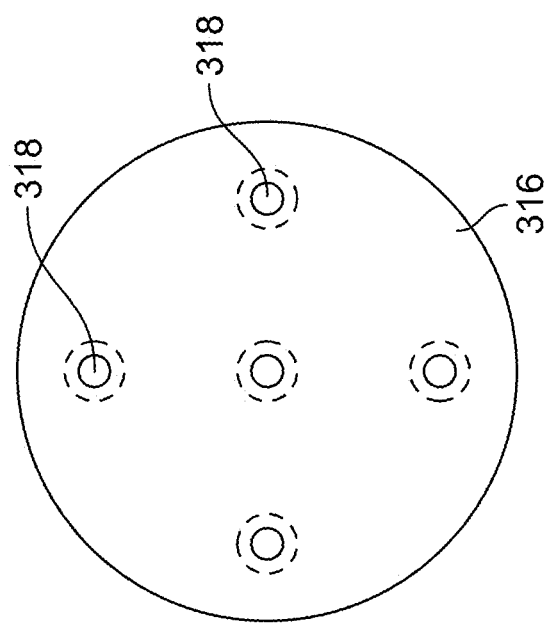

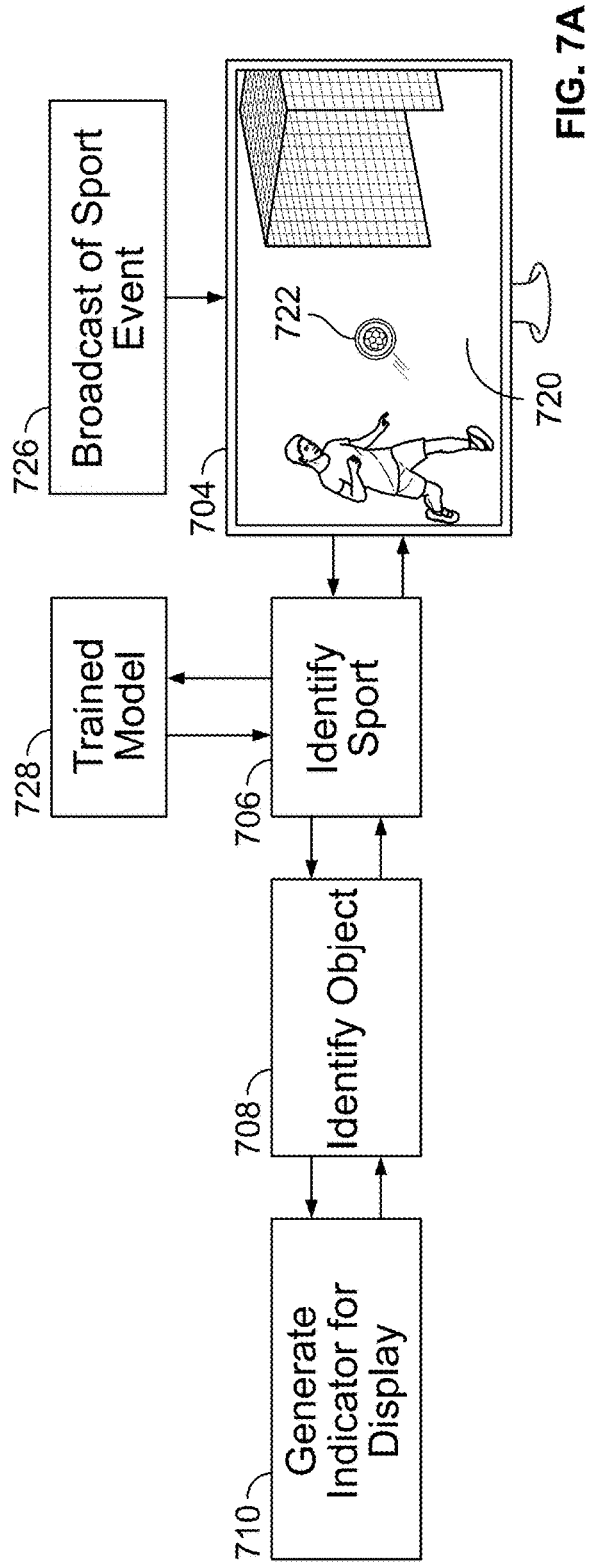
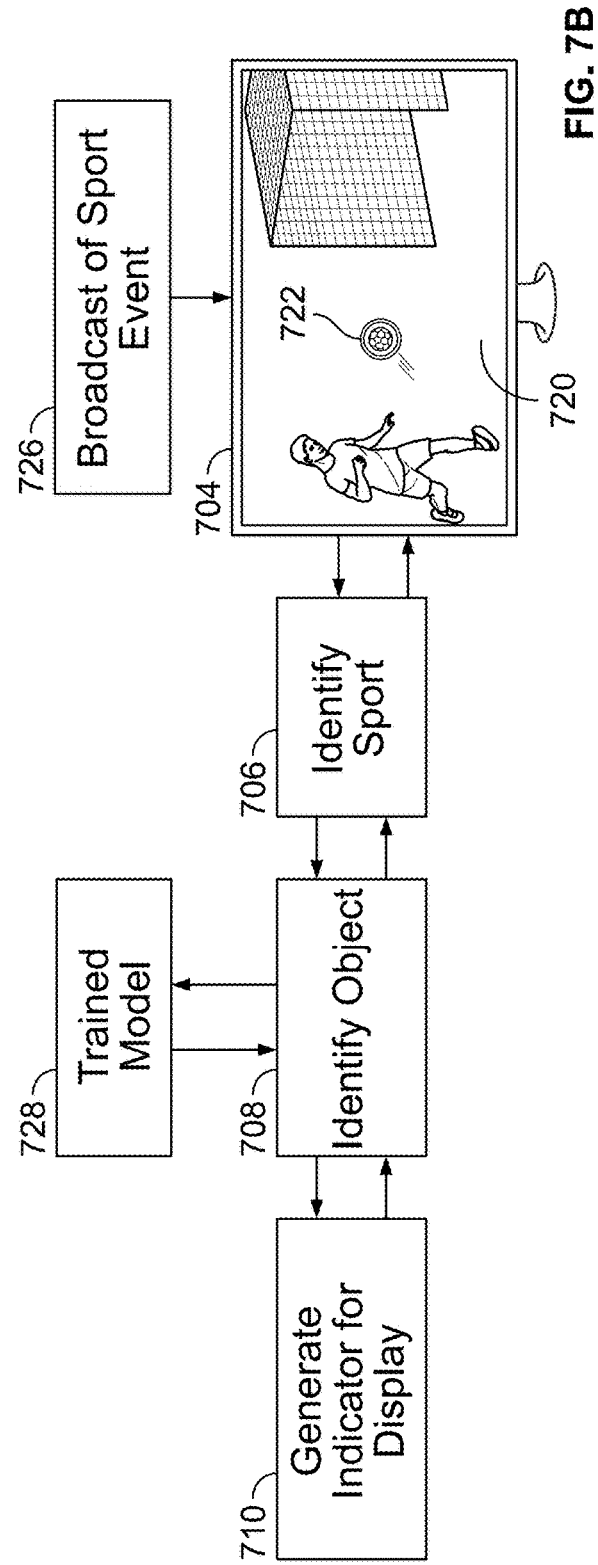
FIG. 7A
FIG. 7B

ENHANCING VIEWING EXPERIENCE BY ANIMATED TRACKING OF USER SPECIFIC KEY INSTRUMENTS

BACKGROUND

The present disclosure is directed towards systems and methods for aiding a user when watching a video of an event. In particular, systems and methods are provided herein that generate an indicator for display in the video that aids a user to track a key instrument in the event whilst watching the event.

SUMMARY

People have enjoyed watching sporting events on television for almost as long as television programs have been broadcast. A wide variety of sporting events are broadcast, including sports such as baseball, rugby, swimming, cricket, tennis and IndyCar racing. All sports include participants, and many include additional objects, such as bats, balls and/or vehicles. Sporting events may be broadcast over-the-air, via cable or to over-the-top providers, such as television streaming platforms. More recently, e-sports have enjoyed a surge in popularity. E-sports are typically video games played on a computing device between multiple participants and may be a digital representation of a physical sport or may be a sport that is possible to be played only in a virtual environment. Typically, e-sports are more likely to be streamed via the internet to streaming platforms, such as Twitch, rather than via traditional broadcast methods. E-sports similarly comprise participants and additional objects, such as virtual bats, balls, vehicles and/or weapons. However, it may be difficult for a viewer to keep track of fast-moving objects and/or participants in a sport. For example, a baseball is relatively small compared to both the players and the field and the ball when hit or thrown can move at speeds in excess of 100 mph.

In view of the foregoing, it would be beneficial to have a system that is capable of applying an indicator to an object and/or a participant when a user is viewing an event. More specifically systems and methods are provided herein that generate an indicator for display in the video that aids a user to track a key instrument in the event whilst watching the event.

Systems and methods are described herein for identifying a key instrument in an event. In accordance with an aspect of the disclosure, a method is provided for identifying a key instrument in an event. The method includes capturing the sport, thereby creating a capture, or otherwise receiving a capture of the sport at a first computing device. The method further includes identifying, at the first computing device, a type of capture. A key instrument is identified at the first computing device. An indicator to apply to and/or around the identified key instrument is generated for display. Creating a capture may comprise generating a video and/or audiovisual stream and/or file at a visual capture device. The stream and/or file may be transmitted to a server. The event type may be identified at the server, the key instrument may be identified at the server, and the indicator to apply to the identified key instrument may be generated for display at the server. The stream and/or file may comprise one or more frames, and at least a subset of the frames may be edited to apply the indicator to the identified sporting equipment and/or the participant.

A typical example may include a broadcaster capturing an event, such as a basketball game, via a video camera and recording the capture to a memory of the video camera as a media file. The media file may be transferred from the memory of the video camera to be received at a PC (or a server). This may be via a physical connection, such as USB 3.0 or firewire. In other examples, this may be via a wireless connection, such as WiFi. In some examples, the video camera may be connected directly to the PC (or server). In other examples, the media file may be transferred from the memory to the PC (or server) via a network, such as the internet. At the PC (or server), the type of event, such as the sport being played may be identified. In this example, a user may manually identify the sport being played, and one or more key instruments, such as the teams playing the sport and/or the players playing the sport. A user may, for example, identify the sport being played, the teams playing the sport and/or the players playing the sport by typing, for example, the sport into a form presented to the user on the computing device. In another example, the computing device may output a query to the user, such as "What sport is being played?" The user may speak the response, which may be received by a microphone of the computing device. Based on the identification, the user may be presented with one or more options, such as "Track basketball?" and/or "Track player LeBron James?" In this example, the user selects the "Track basketball" option. An application running on the PC (or server) may analyze the recording and may identify the location of the basketball on a frame-by-frame basis. In this example, an indication, such as a halo placed around the basketball, is applied to each frame of the recording by the software running on the computer to create an edited media file. In other examples, only I-frames may have the indication applied. In other examples, only a subset of the frames may have the indicator applied, i.e., for example, every second, third, fourth, fifth and/or tenth frame. An advantage of applying the indicator to only a subset of the frames is that the processing power required to generate the indicator for display may be lowered and/or the amount of data that is required to transmit any instructions to apply the indicator may be reduced. The edited media file may be broadcast to a plurality of, for example, televisions and/or uploaded to a server to enable the edited media file to be viewed on demand. In other examples, the sport may be broadcast live (or substantially live). In this example, the indicator may be applied on the fly. For example, a video camera may capture a sporting event for live broadcast and an identified object(s) and/or participant(s) may be identified and tracked substantially in real time. The indicator may be applied to the live broadcast, such that the broadcast that is received by viewers comprises the indicator. In another example, a broadcaster (or commentator) can apply settings in real time. For example, if a commentator is talking about a certain player, they can select a setting that enables the player to be highlighted as the event is being broadcast. Known image recognition and/or object tracking techniques may be used to enable objects and/or participants to be tracked during a broadcast.

The indicator may be automatically selected from a pre-set selection of indicators based on the identified key instrument. For example, if the key instrument is identified as a ball, then a halo indicator may be automatically applied to the ball. In another example, a user may be prompted to select a suitable indicator from a selection of indicators. The selection of indicators presented to a user may be based on the identified key instrument. For example, different types of halo may be presented to the user if the identified key instrument is a ball. In another example, different types of pointer may be presented to the user if the identified key instrument is a participant in the event. In some examples, the user may be prompted to choose a size, color and/or animation frequency for the indicator.

Where the event is a live event, the indicator may be applied substantially in real-time. This may be achieved via, for example, an object tracking algorithm and/or a trained model. In some examples, a plurality of image capture devices may be utilized such that a plurality of captures is received at the first computing device. In some examples, an object tracking algorithm and/or trained model may automatically pick an optimal stream from the plurality of image capture devices in order to track an identified key instrument.

Identifying the event may be based on metadata associated with the captured event. For example, a computing device may receive electronic program guide (EPG) data that indicates a time period, a channel and the sporting event being played. In an example, the EPG data may comprise "MLB, Jun. 16, 2021, Nationals vs Pirates, baseball." In this example, the "baseball" part of the EPG data can be used to identify the sport being played. This may be of particular use if, for example, a smart television is generating the indicator for display to apply to a received broadcast. The smart television may also look up in a database objects associated with the sport. For example, the database may associate "baseball" and "bat" with the sport baseball. The database may also associate players, such as Adam Frazier, with the team "Pirates." This database may be updatable via a network, such as the internet, and a remote server. This data may be used by the smart television to provide one or more options to the user to enable them to select one or more objects and players to apply an indicator to. In other examples, the smart television may simply highlight the objects and the player currently batting. In other examples, the smart television may receive metadata via a remote server and a network, such as the internet.

Identifying the event may comprise identifying the event via a trained machine learning model. For example, the machine learning model may be trained on a database of labelled sport clips. The trained model may be implemented at a server, and the computing device may communicate with the server via a network, such as the internet. For example, the computing device may send a clip of a broadcast sport to the server and may receive an indication of the sport from the remote server. In other examples, a confidence level may also be received by the smart television. If, for example, the confidence level is below a threshold level, such as below 50%, 75%, 85% or 95%, then an additional clip and/or clips may be sent to the remote server for analysis. In other examples, the trained model is implemented at a computing device, such as a smart television. The model may also be trained to identify objects used in the sport and/or participants in the sport. This data may be used to aid with applying an indicator to an object and/or a participant.

The key instrument may be identified based on a setting set by a user. For example, a user may indicate that they only want a tennis racket of a certain player to be indicated when they are watching tennis. In this example, if it is identified that the user is watching a tennis match, then only the racket of the chosen player may be identified, and any other tennis rackets and/or players ignored.

The indicator may be one or more of a pointer, a halo, a shading and/or an animation. For example, a pointer may be a floating pointer that points to an identified object and/or participant. Examples of pointers include arrows and/or a hand with a pointing finger. A halo may be any object that encircles, or substantially surrounds an object and/or a participant. A shading may be any color and/or colors that are applied to an object and/or a participant. An animation may be any moving indicator, such as a GIF, a fireball and/or an animated color ball. In some examples, the indicator may be applied to the identified object. For example, a soccer ball may have one or more flashing circles applied to it. The indicator may move with the identified object and/or participant, such that the movement of the object and/or participant is indicated to the user. The indicator may be opaque, translucent, partially transparent or any combination of these, such as having an opaque border and the rest being partially transparent. Once an object and/or participant has been identified in a frame, known object tracking methods may be utilized to predict where the object and/or participant is in subsequent frame(s), in order to reduce the processing power required to identify the object and/or participant in subsequent frames.

The event may be an e-sport. For example, the sport may be "League of Legends," "Dota," "Counter-Strike," "Valorant," "Overwatch," StarCraft" and/or "Rocket League." As with traditional sports, objects and/or participants may be identified and indicated. The objects may include, for example, weapons, cards, cars and/or projectiles. Metadata may be embedded in a broadcast of an e-sport stream.

Identifying the event and/or the key instrument may be based, at least in part, on an audio stream received at the computing event. For example, the audio stream may comprise a commentator's commentary. The first computing device may run a speech recognition algorithm and based, at least in part, on key words identified in the audio stream, identify a key instrument. In another example, the first computing device may process closed captions (or subtitles) that are received with the capture in order to identify a key instrument. In this way, an indicator may be generated for display based on live commentary of an event. As the commentators identify different key instrument(s), new indicators may be generated for display and applied to the relevant key instruments(s).

The generating for display may comprise generating instructions for displaying an indicator to and/or around the identified key instrument. The method may further comprise transmitting a stream of the event to one or more second computing devices, transmitting the generated instructions to the one or more second computing devices, and wherein the one or more second computing devices combine the stream and the generated instructions to generate a combination of the event and the indicator for display. For example, a smart television may receive a badminton game from a traditional broadcast source, such as cable. In addition, the smart television may receive an additional data stream via a network, such as the internet, that provides instructions for generating an indicator to apply to the received sport. At the smart television, the received stream and the generated indicator may be combined (or the indicator may be overlaid on the broadcast stream) and displayed to the user in order to provide an indicator of, for example, the shuttlecock of the badminton game. In some examples, the functionality of receiving instructions to generate an indicator for display and combining the generated indicator and the received stream may be enabled via an application installed on the smart television from, for example, an app store.

The first computing device may be an augmented reality device, or a mixed reality device, and the device may generate the indicator for display and apply it to an identified key instrument being viewed at the device. For example, a user may be attending a live sporting event, such as a soccer game, and be wearing a mixed reality device. A camera at the mixed reality device may capture the live sporting event. A computing device at (or, in some examples, remote from) the mixed reality device may identify the sport being played and may identify an object and/or a participant in the sport. An indicator for applying to an object and/or a player may be generated for display at the computing device. The mixed reality device may display the indicator to the user, such that the displayed indicator is applied to the real-life object and/or participant via a projector of the mixed reality device.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIGS. 3A-3E show example indicators, in accordance with some embodiments of the disclosure;

FIGS. 7A and 7B show more environments in which a key instrument in an event is identified, in accordance with some embodiments of the disclosure;

DETAILED DESCRIPTION

Figure 1:
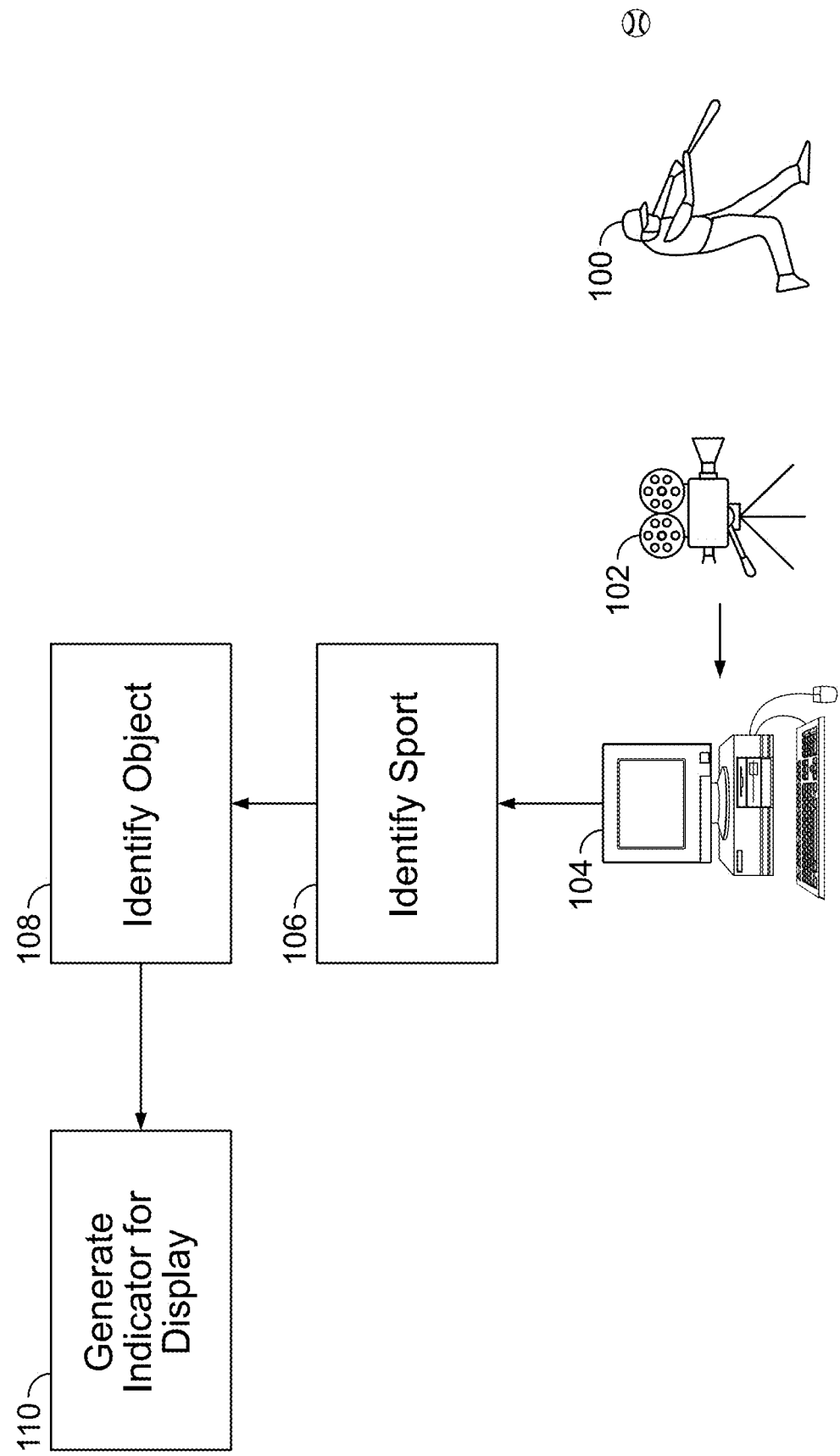
FIG. 1 shows an environment in which a key instrument in an event is identified, in accordance with some embodiments of the disclosure.

Systems and methods are described herein for identifying a key instrument in an event. An "event" is a broad term that covers any type of event that may be captured and broadcast. It includes sporting events, such as a live football game, music events, such as a live performance, nature programs and gameshows, such as Jepordy! A type of event may be, for example, a category of event such as "sport," "music," "nature," "gameshow." As referred to herein, "sport" is a broad term that refers to any form of competitive activity involving one or more people. Traditional sports such as American football, soccer, hockey, cricket, tennis, baseball, athletics and swimming are included. E-sports relating to video games, such as "League of Legends," "Dota," "Counter-Strike," "Valorant," "Overwatch," StarCraft" and/or "Rocket League" are also included. In other examples, the type may include additional information, such as whether the event is "live" (i.e., received substantially in real-time). A "key instrument" is another broad term that covers any item used in the event and or/any participant in the event. For example, if the event is a sport, a key instrument includes any person involved in the sport. The term includes the players of a sport but also people who enforce the rules of the sport, such as referees and umpires. It also includes any equipment used to play the sport, such as balls and bats, as well as fields, goals and plates.

Capturing an event, such as a sport, may take place by any capture device, such as a video camera that captures an event and/or a computing device that captures an e-sport for broadcast. In some examples, capturing an event may comprise using one or more video cameras and/or capture devices. In some examples, a plurality of different capture devices may be utilized to capture an event. Where a single capture device, such as a video camera, is referred to, it is also contemplated that multiple capture devices may be utilized and that the capture may comprise one or more streams from the capture devices. An audiovisual file is any data file that enables a captured sport to be replayed at a computing device. For example, it includes MPEG-1, MPEG-2, MPEG-4, AVI, MOV, AVCHD, H.264, H.265, DivX, DivX HD, Xvid HD, MKV, RMVB, WMV9, TS/TP/M2T, WMV, FLV and/or MP4.

The disclosed methods and systems may be implemented on a computing device. As referred to herein, the computing device can be any device comprising a processor and memory, for example, a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an environment in which a key instrument in an event is identified, in accordance with some embodiments of the disclosure. A sport 100, in this example baseball, is captured at an image capture device, in this example a video camera 102. A capture of the sport 100 is created at the video camera 102. For example, a media file is recorded to a hard drive of the camera 102. The media file comprising a recording of the sport 100 is transmitted from the video camera 102 to a computing device, in this example a PC 104. An application running on the PC 104 is used to identify the sport being played 106. As discussed above, this may take place via metadata associated with the sport. For example, the recorded media file may have a time stamp and location data (such as GPS, GLONASS, BeiDou, Galileo, BavIC, QZSS co-ordinates) associated with it. The application running on the PC 104 may use the time stamp and/or location data to consult a database of sporting events in order to identify the sport being played. In another example, the application may utilize a trained machine learning model in order to identify the sport being played. Once the sport has been identified 106, one or more objects and or participants are identified 108. The identification may be based on a setting set by a user, for example "Identify the baseball." In other examples, a database may be consulted in order to find default objects and/or participants to identify 108. For example, the default for a baseball game may be to identify the baseball. The identification may be performed via an image recognition program that analyzes each frame of a media file. In other examples, the identification may be performed via a trained machine learning model. In other examples, a user may manually identify an object and/or participant in a first frame, and a tracking algorithm may track the object and/or participant in subsequent frames. The first frame may be generated for display at a display of the computing device and the user may manually identify an object by selecting the object with, for example, a cursor. In another example, the user may identify an object by selecting the object via, for example, a touchscreen of the computing device. An algorithm may identify an object based on the location of the cursor and/or touch event. In another example, a user may draw around an object using, for example, a cursor and/or via touch. Again, an algorithm may identify an object based on the user input. Once an object (and/or participant) has been identified, an indicator is generated for display 110. For example, a pointer to indicate where the baseball is in each frame of the media file may be generated for display. In some examples, the media file is edited to apply the pointer to each frame, or a subset of the frames, of the media file, such that the baseball is identified via the pointer when the media file is played back on a computing device.

Figure 2:
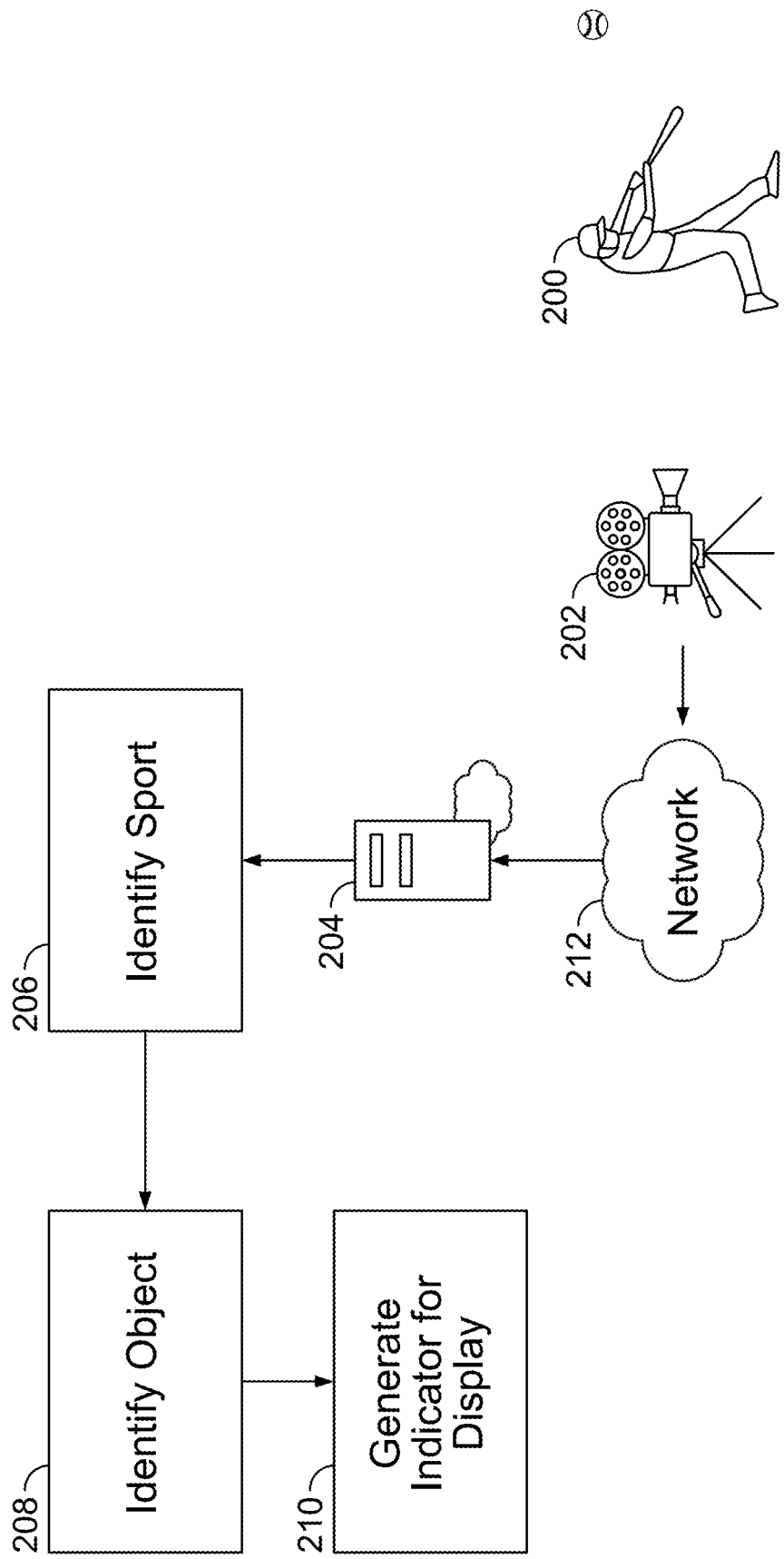
FIG. 2 shows another environment in which a key instrument in an event is identified, in accordance with some embodiments of the disclosure.

FIG. 2 shows another environment in which a key instrument in an event is identified, in accordance with some embodiments of the disclosure. The environment of FIG. 2 is broadly similar to that of FIG. 1. As in FIG. 1, a sport 200, in this example tennis, is captured at an image capture device, in this example a video camera 202. A capture of the sport 200 is created at the video camera 202. For example, a media file is generated at the camera 202. The media file is transmitted via a network 212, for example the internet via wired and/or wireless means, to a server 204. In this example, the media file is transmitted broadly in real time, such that a live stream of the sport 200 is generated. An application running on the server 204 is used to identify the sport being played 206. As discussed above, this may take place via metadata associated with the sport. For example, the recorded media file may have a time stamp and location data (such as GPS, GLONASS, BeiDou, Galileo, BavIC, QZSS co-ordinates) associated with it. The application running on the server 204 may use the time stamp and/or location data to consult a database of sporting events in order to identify the sport being played. In another example, the application may utilize a trained machine learning model in order to identify the sport being played. Once the sport has been identified 206, one or more objects and or participants are identified 208. The identification may be based on a setting set by a broadcaster, for example "Identify the tennis ball." The identification may be performed via an image recognition program that analyzes each frame of a media file. In other examples, the identification may be performed via a trained machine learning model. In other examples, a user may manually identify an object and/or participant in a first frame, and a tracking algorithm may track the object and/or participant in subsequent frames. The first frame may be generated for display at a display of the computing device and the user may manually identify an object by selecting the object with, for example, a cursor. In another example, the user may identify an object by selecting the object via, for example, a touchscreen of the computing device. An algorithm may identify an object based on the location of the cursor and/or touch event. In another example, a user may draw around an object using, for example, a cursor and/or via touch. Again, an algorithm may identify an object based on the user input. Once an object (and/or participant) has been identified, an indicator is generated for display 210. For example, a pointer to indicate where the tennis ball is in each frame of the media file may be generated for display. In some examples, the media file is edited to apply the pointer to each frame, or a subset of the frames, of the media file, such that the tennis ball is identified via the pointer when the media file is played back on a computing device, such as a smart television. The media file may be transmitted from the server 204 to a plurality of computing devices, such as smart televisions, thereby broadcasting a combination of the sport 200 and the generated indicator. In some examples, the server 204 may receive additional objects and/or participants to identify, for example "Identify Nadel." These instructions may complement or replace the original instructions to identify a tennis ball. In this way, commentators can identify objects and participants with an identifier substantially in real time as a live sporting event is being broadcast. In some examples, the server 204 may also receive an audio stream comprising the commentator's commentary. The server 204 may run a speech recognition algorithm and, based, at least in part, on key words identified in the audio stream, identify an object (and/or participant) 208. In this way, an indicator may be generated for display based on live commentary of an event. As the commentators identify different object(s) and/or player(s), new indicators may be generated for display and applied to the relevant object(s) and/or player(s).

Figure 3D:
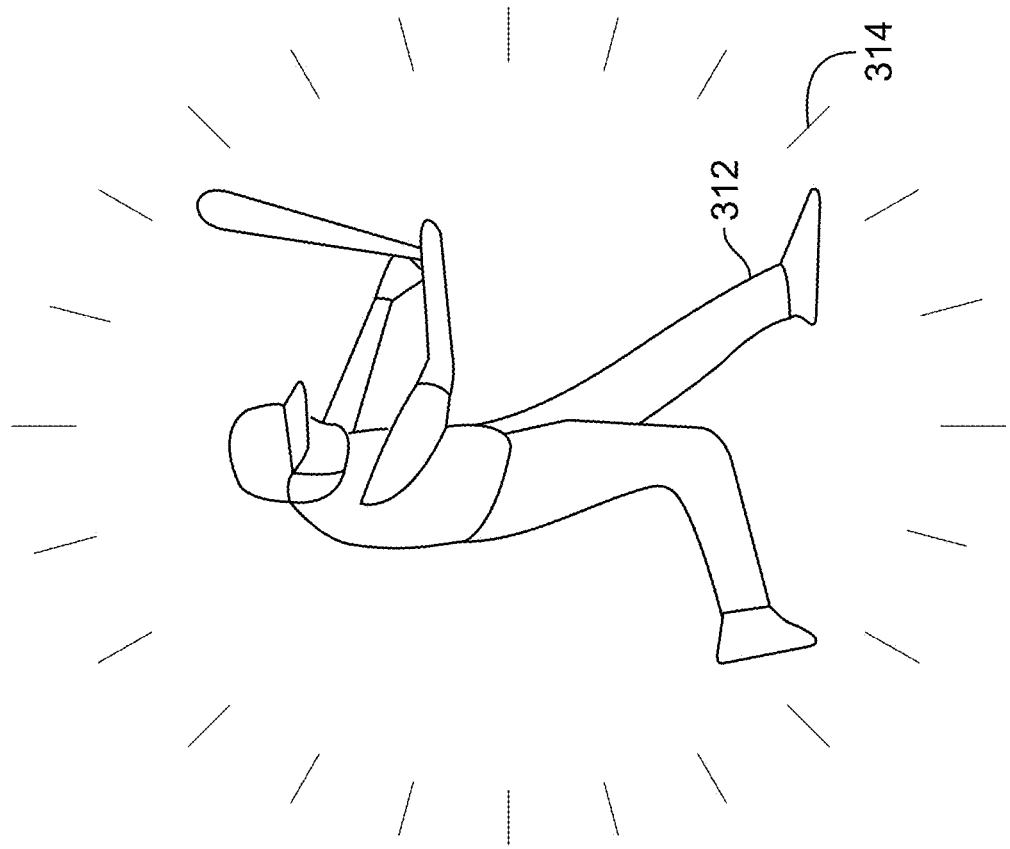

FIGS. 3A-3E show example indicators, in accordance with some embodiments of the disclosure. FIG. 3A shows a baseball 300 with a pointer 302 applied to the baseball 300. In this example, the pointer 302 is touching the baseball 300. However, in other examples, the pointer 302 may point towards the baseball 300 rather than touch it. In some examples, the pointer 302 may be a solid color and may obscure anything that is behind it. In other examples, the pointer 302 may be partially transparent and may enable a viewer to see behind it. The orientation of the pointer 302 may be static on a frame-by-frame basis. In other examples, the pointer 302 may move with respect to the baseball 300. In some examples, the pointer 302 may be animated such that, for example, the entire pointer 302 moves towards and away from the baseball 300. In other examples, the pointer 302 may be animated such that only parts of the pointer 302 move relative to the baseball 300, for example the tip of the pointer 302. The pointer 302 may be any color, or a combination of colors. A gradient effect may be applied to the pointer 302. The border of the pointer 302 may be a first color and the center of the pointer 302 may be a second color. The color (or colors) of the pointer 302 may change with respect to time.

FIG. 3B shows a tennis ball 304 with a halo 306 applied to the tennis ball 304. In this example, the halo 306 is not touching the tennis ball 304. However, in other examples, at least a part of the halo 306 may touch the tennis ball 304. In some examples, the halo 306 may be a solid color and may obscure anything that is behind it. In other examples, the halo 306 may be partially transparent and may enable a viewer to see behind it. The orientation of the halo 306 may be static on a frame-by-frame basis. In other examples, the halo 306 may move with respect to the tennis ball 304. In some examples, the halo 306 may be animated such that, for example, the entire halo 306 moves around the tennis ball 304. In other examples, the halo 306 may be animated such that only parts of the halo 306 move relative to the tennis ball 304, for example a segment of the halo 306. The halo 306 may be any color, or a combination of colors. A gradient effect may be applied to the halo 306. The border of the halo 306 may be a first color and the center of the halo 306 may be a second color. The color (or colors) of the halo 306 may change with respect to time.

Figure 3C:
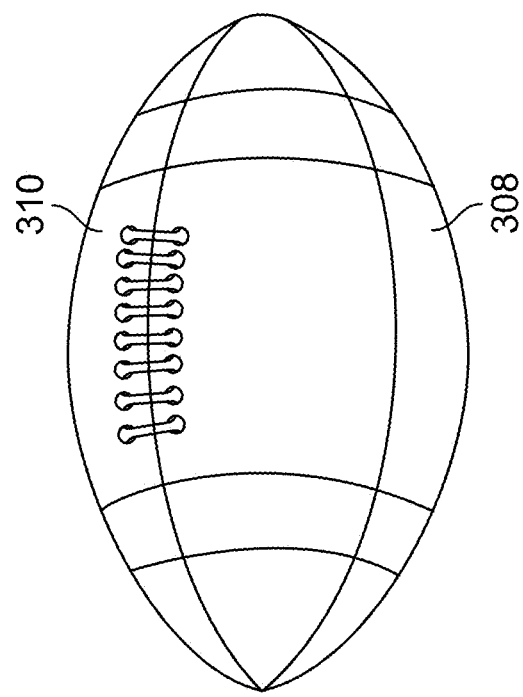

FIG. 3C shows an American football 308 with shading 310 applied to the football 308. In this example, the shading 310 covers the entire football 308. However, in other examples, at least a part of the football 308 may not be shaded. In some examples, the shading 310 may be a solid color and may obscure, or substantially obscure, the football 308. In other examples, the shading 310 may be partially transparent and may enable a viewer to see the football 308. In some examples, the shading 310 may be animated such that, for example, the shading 310 moves around the surface of the football 308. In other examples, the shading 310 may be animated such that only parts of the shading 310 move around the surface of the football 308. The shading 310 may be any color, or a combination of colors. A gradient effect may be applied to the shading 310. The border of the shading 310 may be a first color and the center of the shading 310 may be a second color. The color (or colors) of the shading 310 may change with respect to time.

FIG. 3D shows a baseball player 312 with an animation 314 applied to the player 312. In this example, the animation 314 is not touching the player 312. However, in other examples, at least a part of the animation 314 may touch the player 312. In some examples, the animation 314 may be a solid color and may obscure anything that is behind it. In other examples, the animation 314 may be partially transparent and may enable a viewer to see behind it. The orientation of the animation 314 may be static on a frame-by-frame basis. In other examples, the animation 314 may move with respect to the player 312. In some examples, the animation 314 may be animated such that, for example, the entire animation 314 moves around the player 312. In other examples, the animation 314 may be animated such that only parts of the animation 314 move relative to the player 312, for example a segment of the animation 314. The animation 314 may be any color, or a combination of colors. A gradient effect may be applied to the animation 314. The border of the animation 314 may be a first color and the center of the animation 314 may be a second color. The color (or colors) of the animation 314 may change with respect to time.

FIG. 3E shows a ball 316 with animations 318 applied to the ball 316. In this example, the animations 318 give an effect of flashing lights being applied to the surface of the ball. In some examples, the animations 318 may be a solid color and may obscure the parts of the ball 316 behind it. In other examples, the animations 318 may be partially transparent and may enable a viewer to see behind them. The orientation of the animations 318 may be static on a frame-by-frame basis. In other examples, the animations 318 may move with respect to the ball 316. In some examples, the animations 318 may be animated such that, for example, the animations 318 move around the surface of the ball 316. In other examples, the animations 318 may be animated such that only a subset of the animations 318 move relative to the surface of the ball 316. The animations 318 may be any color, or a combination of colors. A gradient effect may be applied to the animations 318. The border of the animations 318 may be a first color and the center of the animations 318 may be a second color. Each animation of the animations 318 may have its own color or colors. The color (or colors) of the animations 318 may change with respect to time.

Figure 4:
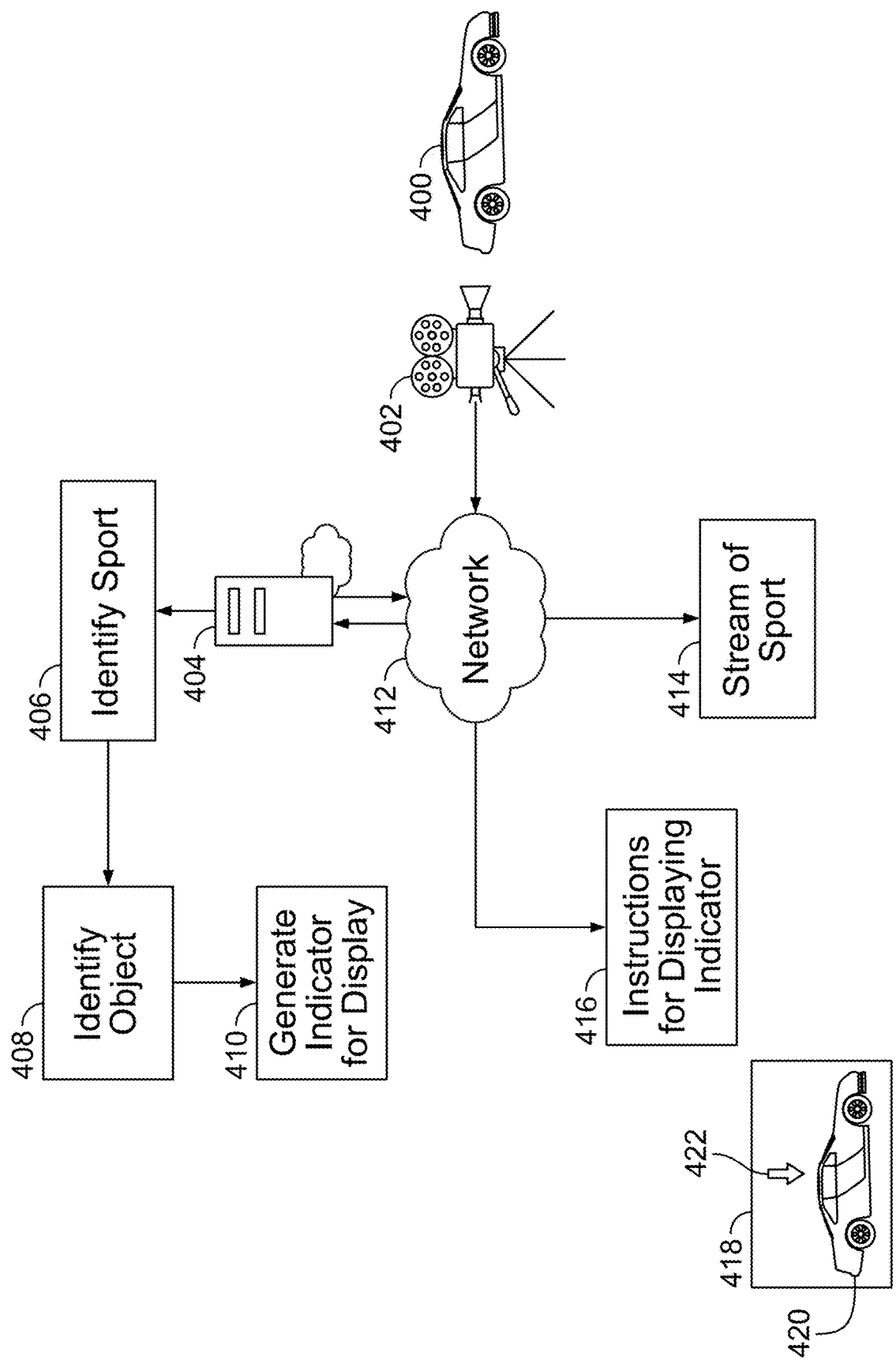
FIG. 4 shows another environment in which a key instrument in an event is identified, in accordance with some embodiments of the disclosure.

FIG. 4 shows another environment in which a key instrument in an event, in accordance with some embodiments of the disclosure. As in FIGS. 1 and 2, a sport 400, in this example NASCAR racing, is captured at an image capture device, in this example a video camera 402. A capture of the sport 400 is created at the video camera 402. For example, a media file is generated at the camera 402. The media file is transmitted via a network 412, for example the internet via wired and/or wireless means, to a server 404. In this example, the media file is transmitted broadly in real time, such that a live stream of the sport 400 is generated. An application running on the server 404 is used to identify the sport being played 406. As discussed above, this may take place via metadata associated with the sport. For example, the recorded media file may have a time stamp and location data (such as GPS, GLONASS, BeiDou, Galileo, BavIC, QZSS co-ordinates) associated with it. The application running on the server 404 may use the time stamp and/or location data to consult a database of sporting events in order to identify the sport being played. In another example, the application may utilize a trained machine learning model in order to identify the sport being played. Once the sport has been identified 406, one or more objects and or participants are identified 408. The identification may be based on a setting set by a broadcaster, for example "Identify car 38." The identification may be performed via an image recognition program that analyzes each frame of a media file. In other examples, the identification may be performed via a trained machine learning model. In other examples, a user may manually identify an object and/or participant in a first frame and a tracking algorithm may track the object and/or participant in subsequent frames. The first frame may be generated for display at a display of the computing device and the user may manually identify an object by selecting the object with, for example, a cursor. In another example, the user may identify an object by selecting the object via, for example, a touchscreen of the computing device. An algorithm may identify an object based on the location of the cursor and/or touch event. In another example, a user may draw around an object using, for example, a cursor and/or via touch. Again, an algorithm may identify an object based on the user input. Once an object (and/or participant) has been identified, an indicator is generated for display 410. For example, a pointer to indicate where car 38 is in each frame of the media file may be generated for display. In this example, the generating an indicator for display comprises generating instructions for another computing device to display the indicator. The media file is transmitted from the server 404, via the network 412, to a computing device, in this example a smart television 418, thereby streaming the sport 414 to the smart television 418. In addition, instructions for displaying the indicator are transmitted via the network 412 to the smart television. At the smart television, the stream and the generated indicator are combined and displayed, such that identified 420 car 38 has an indicator 422 applied to it. An application running on the smart television 418 may combine the streamed sport and the instructions for generating an indicator for display, such that the two are displayed on a display of the smart television 418 at the same time. As before, the application may be downloaded from an app store. The instructions may comprise an indication of each frame in the stream and co-ordinates of where to apply a pointer on each frame. For example, "Frame 3, 420×482, Frame 4, 422×490" and so forth. In some examples, the server 404 may receive additional objects and/or participants to identify, for example "identify car 98." These instructions may complement or replace the original instructions to identify car 38. In this way, commentators can identify objects and participants with an identifier substantially in real time as a live sporting event is being broadcast.

Figure 5:
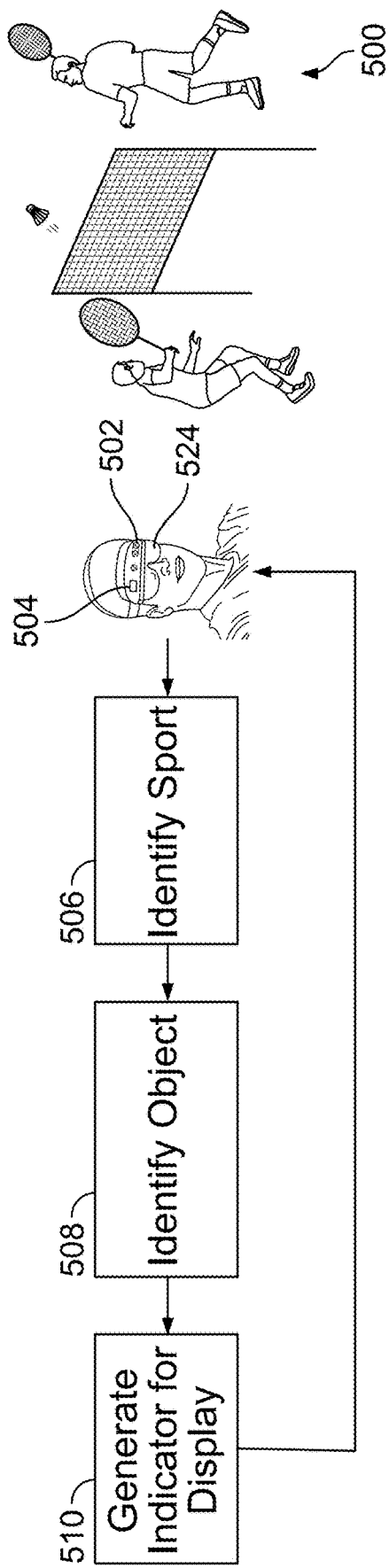
FIG. 5 shows another environment in which a key instrument in an event is identified, in accordance with some embodiments of the disclosure.

FIG. 5 shows another environment in which a key instrument in an event is identified, in accordance with some embodiments of the disclosure. A sport 500, in this example badminton, is captured at an image capture device, in this example a camera 502 of a mixed reality device being worn by a user. The sport 500 is captured at the camera 502. For example, the output of the camera 502 is stored in the RAM of a processing unit 504 of the mixed reality device. An application running at the processing unit 504 is used to identify the sport being played 506. As discussed above, this may take place via metadata associated with the sport. For example, the processing unit may identify the current time and/or location co-ordinates (such as GPS, GLONASS, BeiDou, Galileo, BavIC, QZSS co-ordinates). The application may use the time stamp and/or location data to consult a database of sporting events in order to identify the sport being played. In another example, the application may utilize a trained machine learning model in order to identify the sport being played. Once the sport has been identified 506, one or more objects and or participants are identified 508. The identification may be based on a setting set by a user, for example "Identify the shuttlecock." In other examples, a database may be consulted in order to find default objects and/or participants to identify 508. For example, the default for a badminton game may be to identify the shuttlecock. The identification may be performed via an image recognition program that analyzes each frame of a media file. In other examples, the identification may be performed via a trained machine learning model. In other examples, a user may manually identify an object and/or participant in a first frame, and a tracking algorithm may track the object and/or participant in subsequent frames. The first frame may be generated for display at a display of the computing device and the user may manually identify an object by selecting the object with, for example, a cursor. In another example, the user may identify an object by selecting the object via, for example, a touchscreen of the computing device. An algorithm may identify an object based on the location of the cursor and/or touch event. In another example, a user may draw around an object using, for example, a cursor and/or via touch. Again, an algorithm may identify an object based on the user input. Once an object (and/or participant) has been identified, an indicator is generated for display 510. The mixed reality device may display the indicator to the user, such that the displayed indicator is applied to the real-life object and/or participant via a projector 524 of the mixed reality device.

Figure 6:
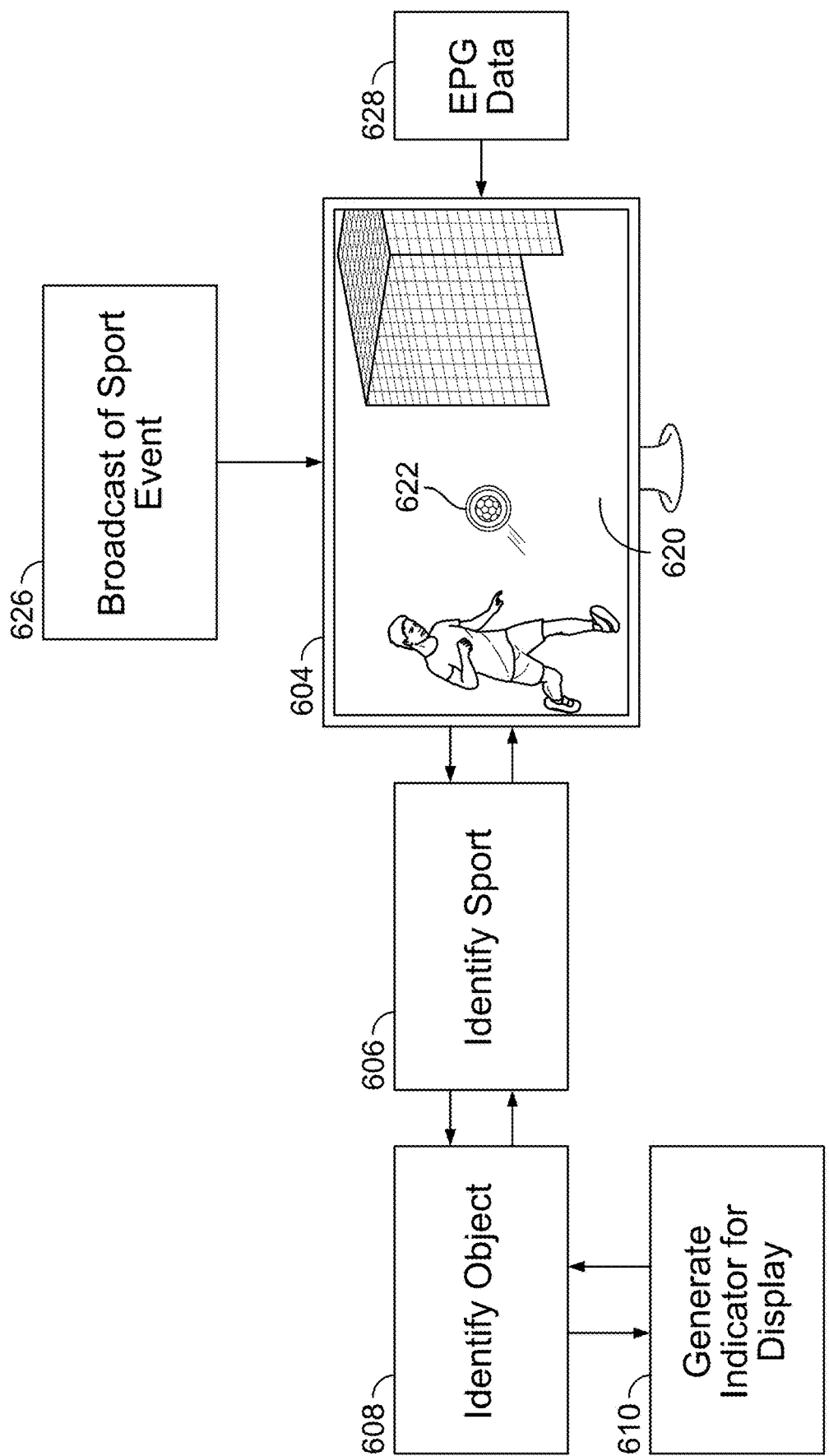
FIG. 6 shows another environment in which a key instrument in an event is identified, in accordance with some embodiments of the disclosure.

FIG. 6 shows an environment in which a key instrument in an event is identified, in accordance with some embodiments of the disclosure. A broadcast of a sport event 626, in this example soccer, is received at a smart television 604. An application running on the smart television 604 is used to identify the sport being played 606. The smart television 604 accesses EPG data 628 in order to identify the sport being played. For example, a computing device may receive EPG data that indicates a time period, a channel and the sporting event being played. In an example, the EPG data may comprise "Jun. 15, 2021, France vs Germany, soccer." In this example, the "soccer" part of the EPG data can be used to identify the sport being played. Once the sport has been identified 606, one or more objects and or participants are identified 608. The identification may be based on a setting set by a user, for example "Identify the ball." In other examples, a database may be consulted in order to find default objects and/or participants to identify 608. An application running on the smart television 604 may also look up in a database objects associated with the sport. For example, the database may associate "ball" with the sport "soccer." The database may also associate players, such as "Marco Reus," with the team "Germany." The identification may be performed via an image recognition program that analyzes each frame of a media file. In other examples, the identification may be performed via a trained machine learning model. In other examples, a user may manually identify an object and/or participant in a first frame, and a tracking algorithm may track the object and/or participant in subsequent frames. The first frame may be generated for display at a display of the computing device and the user may manually identify an object by selecting the object with, for example, a cursor. In another example, the user may identify an object by selecting the object via, for example, a touchscreen of the computing device. An algorithm may identify an object based on the location of the cursor and/or touch event. In another example, a user may draw around an object using, for example, a cursor and/or via touch. Again, an algorithm may identify an object based on the user input. Once an object (and/or participant) has been identified, an indicator is generated for display 610. For example, a halo 622 to indicate where the ball is in each frame of the received broadcast may be generated for display. The halo 622 may be applied to each frame, or a subset of the frames, such that the ball is identified via the halo 622 when the soccer game 620 is played back on the smart television 604.

FIGS. 7A and 7B show more environments in which a key instrument in an event is identified, in accordance with some embodiments of the disclosure. A broadcast of a sport 726, in this example soccer, is received at a smart television 704. An application running on the smart television 704 is used to identify the sport being played 706. In FIG. 7A, an application running on the smart television accesses a trained machine learning model 728 in order to identify the sport being played. The machine learning model may be trained on a database of labelled sport clips. The trained model may be implemented at a server, and the application running on the smart television 704 may communicate with the server via a network, such as the internet. For example, the application running on the smart television 704 may send a clip of a broadcast sport to the server and may receive an indication of the sport from the remote server. In other examples, a confidence level may also be received by the smart television. If, for example, the confidence level is below a threshold level, such as below 50%, 75%, 85% or 95%, then an additional clip and/or clips may be sent to the remote server for analysis. In other examples, the trained model 728 is implemented at the smart television 704. Once the sport has been identified 706, one or more objects and or participants are identified 708. The identification may be based on a setting set by a user, for example "Identify the ball." In other examples, a database may be consulted in order to find default objects and/or participants to identify 708. An application running on the smart television 704 may also look up in a database objects associated with the sport. For example, the database may associate "ball" with the sport "soccer". The database may also associate players, such as "Marco Reus", with the team "Germany". The identification may be performed via an image recognition program that analyzes each frame of a media file. In other examples, the identification may be performed via a trained machine learning model. In other examples, a user may manually identify an object and/or participant in a first frame, and a tracking algorithm may track the object and/or participant in subsequent frames. The first frame may be generated for display at a display of the computing device and the user may manually identify an object by selecting the object with, for example, a cursor. In another example, the user may identify an object by selecting the object via, for example, a touchscreen of the computing device. An algorithm may identify an object based on the location of the cursor and/or touch event. In another example, a user may draw around an object using, for example, a cursor and/or via touch. Again, an algorithm may identify an object based on the user input. Once an object (and/or participant) has been identified, an indicator is generated for display 710. For example, a halo 722 to indicate where the ball is in each frame of the received broadcast may be generated for display. The halo 722 may be applied to each frame, or a subset of the frames, such that the ball is identified via the halo 722 when the soccer game 720 is played back on the smart television 704.

FIG. 7B is a variation of the environment shown in FIG. 7A, wherein the object is identified 708 via a trained model 728. As before, the machine learning model may be trained on a database of labelled sport clips. The trained model may be implemented at a server, and the application running on the smart television 704 may communicate with the server via a network, such as the internet. For example, the application running on the smart television 704 may send a clip of a broadcast sport to the server and may receive an indication of the sport or key instrument from the remote server. In other examples, a confidence level may also be received by the smart television. If, for example, the confidence level is below a threshold level, such as below 50%, 75%, 85% or 95%, then an additional clip and/or clips may be sent to the remote server for analysis. In other examples, the trained model 728 is implemented at the smart television 704. In other examples, the trained model 728 may be used to identify the sport 706 and identify an object and/or participant 708.

Figure 8:
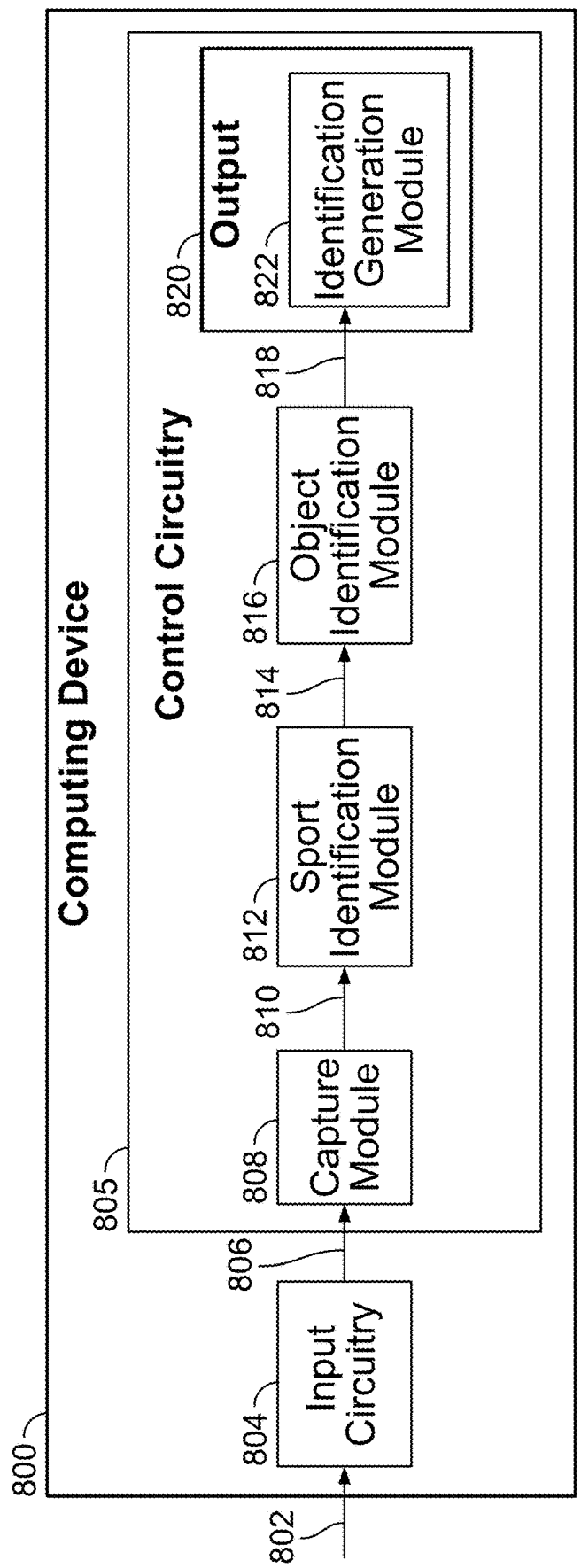
FIG. 8 shows a block diagram representing components of a computing device and data flow therebetween for identifying a key instrument in an event, in accordance with some embodiments of the disclosure.

FIG. 8 shows a block diagram representing components of a computing device and data flow therebetween for identifying a key instrument in an event, in accordance with some embodiments of the disclosure. Computing device 800 (e.g., a PC 104, server 204, 404, mixed reality device 504, smart television 604 and/or smart television 704, as discussed in connection with FIGS. 1-7B) comprises input circuitry 804, control circuitry 805 and an output module 820. Control circuitry 805 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

A user provides an input 802 that is received by the input circuitry 804. The input circuitry 804 is configured to receive a user input related to a computing device. For example, this may be via a touchscreen, keyboard, mouse, microphone and/or infra-red controller of the computing device 800. The input circuitry 804 transmits 806 the user input to the control circuitry 805.

The control circuitry 805 comprises a capture module 808, a sport identification module 812, an object identification module 816 and an output module 820. The user input is transmitted 806 to the capture module 808. At the capture module 808, a capture is received, for example, an audio-visual media file. The received media file is transferred 810 to the sport identification module 812, where a sport is identified. The media file and an indication of the identified sport are transferred 814 to the object identification module 816, where an object and/or a participant in the indicated sport is identified. An indication of the sport being played, an identified object and/or participant and the media file are transferred to the output module 820. At the output module 820, the indicator generation module 822 generates an indication to apply to the identified item of sporting equipment and/or participant for display.

Figure 9:
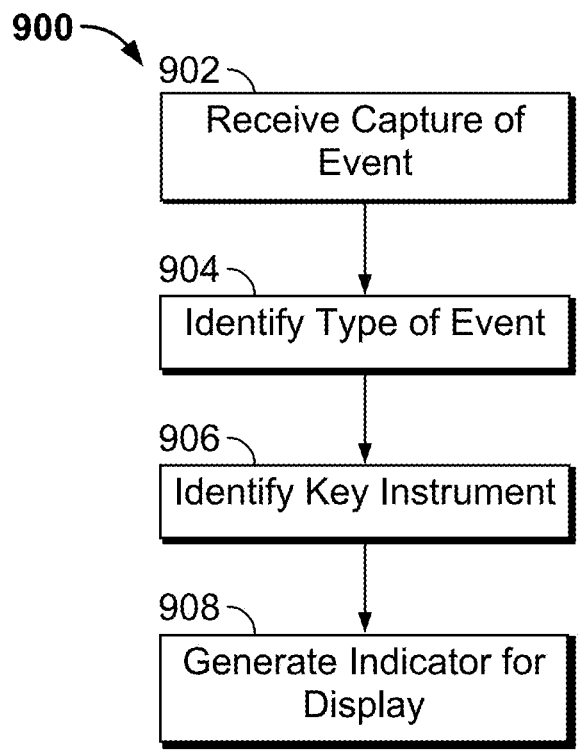
FIG. 9 is a flowchart of illustrative steps for identifying a key instrument in an event, in accordance with some embodiments of the disclosure.

FIG. 9 is a flowchart of illustrative steps for identifying a key instrument in an event, in accordance with some embodiments of the disclosure. Process 900 may be implemented on any of the aforementioned computing devices (e.g., PC 104, server 204, 404, mixed reality device 504 and/or smart television 604, 704). In addition, one or more actions of the process 900 may be incorporated into or combined with one or more actions of any other processes or embodiments described herein.

At 902, a capture of an event is received. At 904, a type of event in the capture is identified. At 906 a key instrument identified. At 908, an indicator to apply to the identified key instrument is generated for display.

Figure 10:
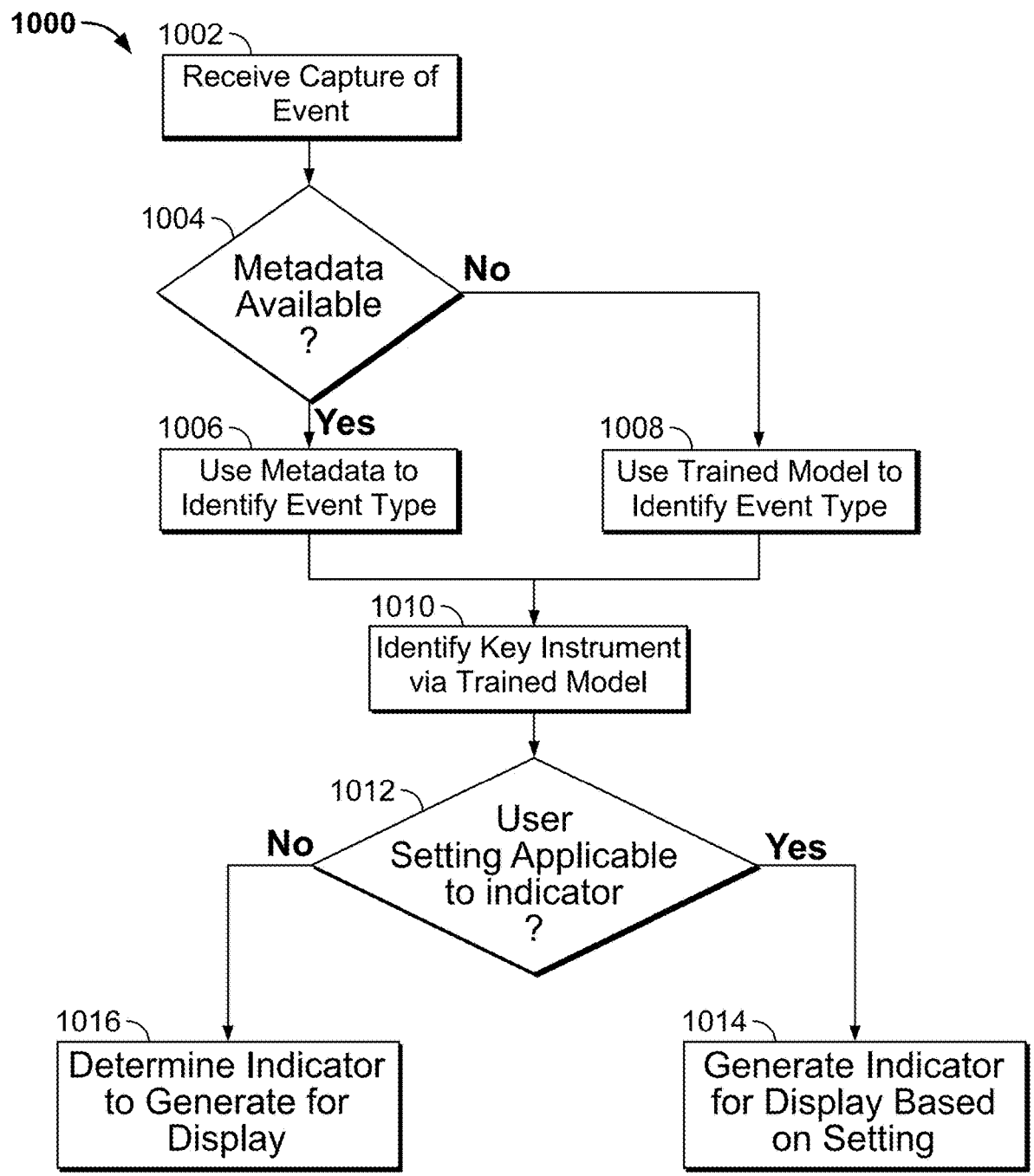
FIG. 10 is another flowchart of illustrative steps for identifying a key instrument in an event, in accordance with some embodiments of the disclosure.

FIG. 10 is another flowchart of illustrative steps for identifying a key instrument in an event, in accordance with some embodiments of the disclosure. Process 1000 may be implemented on any of the aforementioned computing devices (e.g., PC 104, server 204, 404, mixed reality device 504 and/or smart television 604, 704). In addition, one or more actions of the process 1000 may be incorporated into or combined with one or more actions of any other process or embodiments described herein.

At 1002, a capture of an event is received. At 1004 it is identified whether metadata relevant to the capture, such as EPG data, is available. If metadata is available, at 1006, the metadata is used to identify the event type in the capture. If metadata is not available, at 1008, a trained machine model is used to identify the event type in the capture. At 1010, a key instrument in the capture is identified via a trained model. At 1012 it is identified whether a user setting applicable to the indicator is available, for example, which key instruments to indicate for a particular sport. If a user setting is available, at 1014 an indicator is generated for display based on the setting. If a user setting is not available, at 1016, it is determined what indictor to generate for display. This may be based on, for example, a default for an identified sport.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, at a first computing device, a capture of an event, wherein the capture comprises a plurality of frames;
   receiving a time stamp and location data associated with the capture;
   querying a first database with the time stamp and the location data to identify a type of the event;
   querying a second database with the type of the event to select a first key instrument;
   accessing a setting to select a second key instrument;
   identifying, at the first computing device, the first key instrument and the second key instrument in the capture, wherein the first key instrument is in a first frame of the capture and at a first location in the capture, and wherein the second key instrument is in a second location in the capture;
   generating, for display, a first indicator to apply to the identified first key instrument in the first frame of the capture and at the first location;
   generating, for display, a second indicator to apply to the identified second key instrument at the second location;
   identifying, in a second frame of the capture subsequent to the first frame, that the first key instrument has moved to a third location in the capture; and
   generating for display, the first indicator to apply to the identified first key instrument in the second frame of the capture and at the third location.

2. The method of claim 1, wherein:
   the capture comprises a video stream and/or a video file;
   the method further comprises transmitting the video stream and/or the video file to a server; and
   the first computing device is the server.

3. The method of claim 1, wherein receiving the time stamp and the location data further comprises receiving metadata associated with the capture of the event, wherein the metadata comprises the time stamp and the location data.

4. The method of claim 1, wherein the first indicator is a halo and/or a shading.

5. The method of claim 1, wherein:
   the first computing device is an augmented reality device, or a mixed reality device;
   the method further comprises identifying that a user of the first computing device is viewing the identified first key instrument; and
   generating the first indicator for display further comprises applying the first indicator to the identified first key instrument being viewed at the respective augmented reality device or mixed reality device.

6. A system comprising:
   a communication port;
   a memory storing instructions; and
   control circuitry communicably coupled to the memory and the communication port and configured to execute the instructions to:
      receive, at a first computing device, a capture of an event, wherein the capture comprises a plurality of frames;
      receive a time stamp and location data associated with the capture;
      query a first database with the time stamp and the location data to identify a type of the event;
      query a second database with the type of the event to select a first key instrument;
      access a setting to select a second key instrument;
      identify, at the first computing device, the first key instrument and the second key instrument in the capture of the event, wherein the first key instrument is in a first frame of the capture and at a first location in the capture, and wherein the second key instrument is in a second location in the capture; and
      generate, for display, a first indicator to apply to the identified first key instrument in the first frame of the capture and the first location;
      generate, for display, a second indicator to apply to the identified second key instrument at the second location;
      identify, in a second frame of the capture subsequent to the first frame, that the first key instrument has moved to a third location in the capture; and
      generate for display, the first indicator to apply to the identified first key instrument in the second frame of the capture and at the third location.

7. The system of claim 6, wherein:
   the capture comprises a video stream and/or a video file;
   the control circuitry is further configured to transmit the video stream and/or the video file to a server; and
   the first computing device is the server.

8. The system of claim 6, wherein the control circuitry configured to receive the time stamp and the location data is further configured to receive metadata associated with the capture of the event, wherein the metadata comprises the time stamp and the location data.

9. The system of claim 6, wherein the control circuitry configured to generate the first indicator is further configured to generate the first indicator comprising a halo and/or a shading.

10. The system of claim 6, wherein the first computing device is an augmented reality device, or a mixed reality device;
    the control circuitry is further configured to identify that a user of the first computing device is viewing the identified first key instrument; and the control circuitry configured to generate the first indicator for display is further configured to apply the first indicator to the identified first key instrument being viewed at the respective augmented reality device or mixed reality device.

11. The method of claim 1, wherein identifying the first key instrument and the second key instrument further comprises:
identifying a plurality of key instruments in the first frame of the capture, wherein the plurality of key instruments comprises the first key instrument and the second key instrument;
generating, for output, a user interface comprising a plurality of selectable user interface elements, each user interface element corresponding to a key instrument of the plurality of identified key instruments;
receiving, at the first computing device, first and second inputs associated with two of the plurality of selectable user interface elements; and
identifying the first key instrument and the second key instrument based on the received first and second inputs.

12. The method of claim 1, further comprising identifying the first indicator to apply based on the identified first key instrument.

13. The system of claim 6, wherein the control circuitry configured to identify the first key instrument and the second key instrument is further configured to:
identify a plurality of key instruments in the first frame of the capture, wherein the plurality of key instruments comprises the first key instrument and the second key instrument;
generate, for output, a user interface comprising a plurality of selectable user interface elements, each user interface element corresponding to a key instrument of the plurality of identified key instruments;
receive, at the first computing device, first and second inputs associated with two of the plurality of selectable user interface elements; and
identify the first key instrument and the second key instrument based on the received first and second inputs.

14. The system of claim 6, further comprising control circuitry configured to identify the first indicator to apply based on the identified first key instrument.

15. The method of claim 1, wherein generating the first indicator for display further comprises editing at least a subset of the plurality of frames to apply the first indicator to the identified first key instrument.

16. The system of claim 6, wherein the control circuitry configured to generate the first indicator for display further comprises control circuitry configured to edit at least a subset of the plurality of frames to apply the first indicator to the identified first key instrument.

17. The method of claim 1, wherein receiving the time stamp and the location data further comprises receiving at least one of the time stamp and the location data via EPG data.

18. The method of claim 1, wherein generating the first and the second indicator for display further comprises generating instructions for generating the first and the second indicator for display at a second computing device.

19. The system of claim 6, wherein the control circuitry configured to receive the time stamp and the location data is further configured to receive at least one of the time stamp and the location data via EPG data.

20. The system of claim 6, wherein the control circuitry configured to generate the first and the second indicator for display is further configured to generate instructions for generating the first and the second indicator for display at a second computing device.

* * * * *